(12) United States Patent
Proie et al.

(10) Patent No.: US 11,360,616 B1
(45) Date of Patent: Jun. 14, 2022

(54) STYLUS WITH TOUCH INPUT AND COMPRESSIVE FORCE SENSORS

(71) Applicant: Apple Inc., Cupertino, CA (US)

(72) Inventors: Robert M. Proie, Belmont, CA (US); Robert U. Liu, Santa Clara, CA (US); Wing Kong Low, Sunnyvale, CA (US); Nan Wang, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/467,008

(22) Filed: Sep. 3, 2021

Related U.S. Application Data

(60) Provisional application No. 63/083,777, filed on Sep. 25, 2020.

(51) Int. Cl.
*G06F 3/044* (2006.01)
*G06F 3/0354* (2013.01)
*G06F 3/041* (2006.01)

(52) U.S. Cl.
CPC ........ *G06F 3/0442* (2019.05); *G06F 3/03545* (2013.01); *G06F 3/044* (2013.01); *G06F 3/04166* (2019.05); *G06F 2203/04105* (2013.01)

(58) Field of Classification Search
CPC .. G06F 3/03545; G06F 3/04166; G06F 3/044; G06F 3/0442; G06F 2203/04105
See application file for complete search history.

(56) References Cited

U.S. PATENT DOCUMENTS

| | | |
|---|---|---|
| 9,035,743 B2 | 5/2015 | Omar et al. |
| 9,727,161 B2 | 8/2017 | Hinckley et al. |
| 9,946,365 B2 | 4/2018 | Cueto |
| 10,168,804 B2 | 1/2019 | Zimmerman et al. |
| 10,496,193 B1 | 12/2019 | Alfano et al. |
| 10,564,724 B1 | 2/2020 | Bergeron et al. |
| 2014/0035887 A1* | 2/2014 | Kim ................ G06F 3/03545 345/179 |
| 2015/0212578 A1 | 7/2015 | Lor et al. |
| 2016/0139690 A1 | 5/2016 | Chang |
| 2016/0282970 A1 | 9/2016 | Evreinov et al. |
| 2020/0012358 A1 | 1/2020 | Marshall et al. |

* cited by examiner

*Primary Examiner* — Michael Pervan
(74) *Attorney, Agent, or Firm* — BakerHostetler

(57) ABSTRACT

A stylus or other tactile-based input device can receive different types of tactile input from a user. The tactile input sensing functions can be performed by a touch input sensor, such as a capacitive sensing device, and a compressive force sensor, such as a capacitive gap sensor. A touch input sensor can be integrated into an input device in a low profile form and overlap the compressive force sensor so that both touch input and compressive force input can be detected in the same regions of the stylus. Both types of tactile input can be received at the user's natural grip location.

20 Claims, 10 Drawing Sheets

STYLUS WITH TOUCH INPUT AND COMPRESSIVE FORCE SENSORS

CROSS-REFERENCE TO RELATED APPLICATION

This application claims the benefit of U.S. Provisional Application No. 63/083,777, entitled "STYLUS WITH TOUCH INPUT AND COMPRESSIVE FORCE SENSORS," filed Sep. 25, 2020, the entirety of which is incorporated herein by reference.

TECHNICAL FIELD

The present description relates generally to input devices, and, more particularly, to a stylus with touch input and compressive force sensors.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
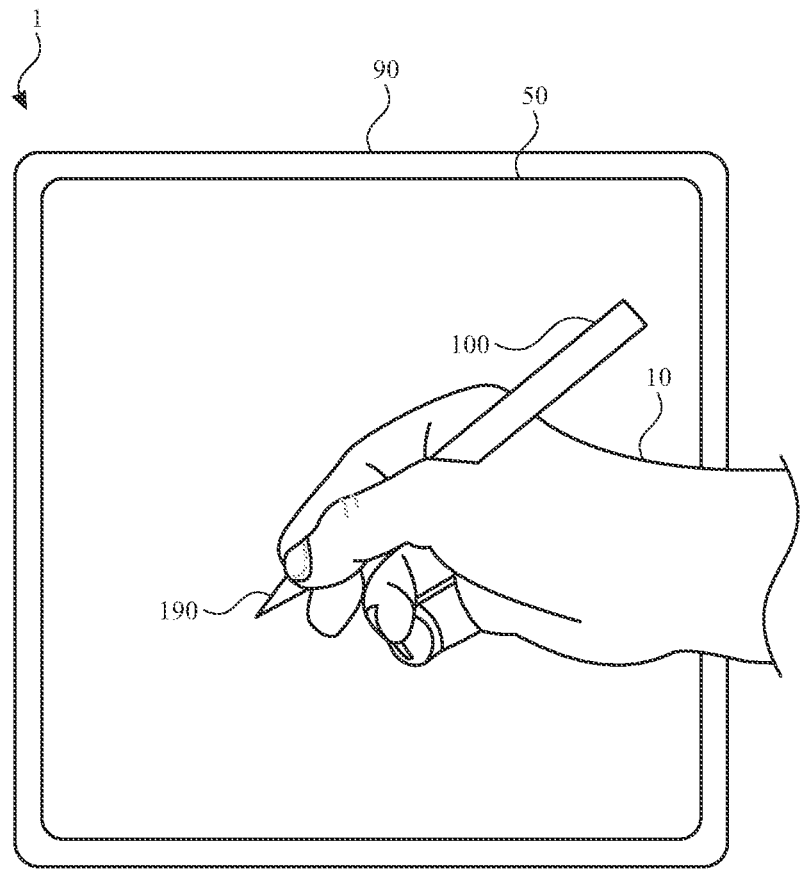
FIG. 1 illustrates a view of a system including a stylus and an external device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

Furthermore, while the user is holding a stylus or other tactile input device, the user may be limited to the input options provided thereby. Accordingly, additional input capabilities that are integrated into the input device would provide the user with expanded input capabilities without the need to simultaneously operate additional input devices. Some existing styluses or other tactile input devices may require a user to operate input components that are at a location other than the user's natural grip location, thereby requiring that the user adjust the grip to provide the desired input.

In accordance with embodiments disclosed herein, improved tactile-based input devices can receive different types of tactile input from a user. The tactile input sensing functions can be performed by a touch input sensor, such as a capacitive sensing device, and a compressive force sensor, such as a capacitive gap sensor. A touch input sensor can be integrated into an input device in a low profile form and overlap the compressive force sensor so that both touch input and compressive force input can be detected in the same regions of the stylus. Both types of tactile input can be received at the user's natural grip location.

These and other embodiments are discussed below with reference to FIGS. 1-13. However, those skilled in the art will readily appreciate that the detailed description given herein with respect to these Figures is for explanatory purposes only and should not be construed as limiting.

A tactile input device in accordance with embodiments disclosed herein can include any device that is held, worn, or contacted by a user for providing input and/or receiving feedback. The tactile input device can be used alone or in conjunction with another device. For example, FIG. 1 illustrates a system 1 including a stylus 100 and an external device 90 having a surface 50, according to some embodiments of the subject technology. The stylus 100 can be held by a user 10 and operate as a tactile input device for use with the external device 90.

The surface 50 of the external device 90 can include a display surface and/or a touch panel for interacting with the stylus 100 when contacted thereby. The external device 90 utilizes the display to render images to convey information to the user. The display can be configured to show text, colors, line drawings, photographs, animations, video, and the like. The surface 50 of the external device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the external device 90 and/or the stylus 100. For example, the stylus 100 can include one or more sensors that detect when the tip 190 contacts and applied pressure to the surface 50. Such sensors can include one or more contact sensors, capacitive sensors, touch input sensors, cameras, piezoelectric sensors, pressure sensors, proximity sensors, electric field sensors, photodiodes, and/or other sensors operable to detect contact with the surface 50. Such sensors can optionally operate cooperatively with the external device 90 to detect contact with the surface 50.

Figure 2:
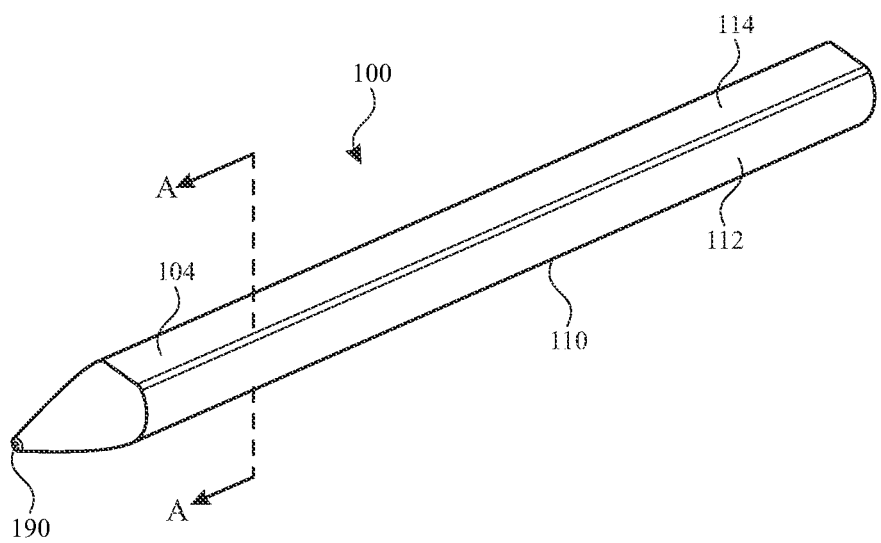
FIG. 2 illustrates a perspective view of the stylus of FIG. 1, according to some embodiments of the subject technology.

The stylus 100 can support handling and operation by a user. In particular, the stylus 100 can receive inputs from a user at a location of the user's grip. FIG. 2 illustrates a stylus 100, according to some embodiments of the subject technology. According to some embodiments, for example as illustrated in FIG. 2, the stylus 100 can include a housing 110 that provides an outermost cover along at least a portion of the length of the stylus 100. A user can grip the stylus 100 at a user grip region 104 during use of the stylus 100. The user grip region 104 can be located at a natural grip location, so that the user can provide inputs at the same location that is grasped during normal use of the stylus 100. For example, the user grip region 104 can be located an outer surface of the housing 110. The user grip region 104 can be near the tip 190 of the stylus 100. For example, the location of the user grip region 104 can be a distance from the tip 190 that is less than a half, a third, or a quarter of the total length of the stylus 100. At the user grip region 104, components of the stylus 100 can be positioned to receive tactile input from the user. For example, the user grip region 104 can be a portion of the housing 110. Alternatively or in combination, the user grip region 104 can include an input component 102 set within the housing 110, such as a button, switch, knob, lever, and/or another input component 102. According to some embodiments, a marker can be provided on the outer surface 112 as an indicator for the location of the user grip region 104. The marker can be flush with neighboring portions of the outer surface, such that it can be seen but provide the same tactile features as other portions of the housing 110. Alternatively or in combination, the marker can provide a protrusion, recess, or texture that provides surface features that are different from adjacent portions of the housing 110.

The housing 110 of the stylus 100 can have one or more of a variety of shapes. FIG. 2 illustrates a stylus 100 with a housing 110 having a non-circular cross-sectional shape. The housing 110 provides an outermost cover along at least a portion of the length of the stylus 100, including the user grip region 104. As shown in FIG. 2, the housing 110 can include a curved portion 112 and a flat portion 114. The flat portion 114 can be used to stabilize the stylus 100 against another surface, such as a working surface, an electronic device, and/or a charging station. It will be understood that other cross-sectional shape, including circular cross-sectional shapes, can be provided by the housing 110 of a stylus 100.

The stylus 100 can include a touch input sensor 200 within the housing 110. The touch input sensor 200 can extend along at least a portion of a length of the stylus 100.

Figure 3:
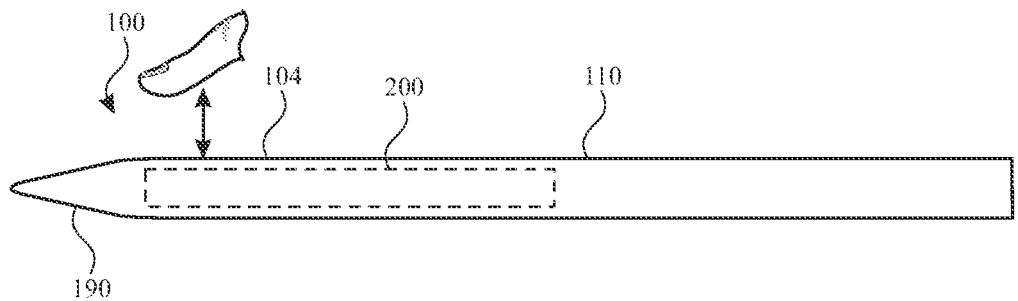
FIG. 3 illustrates a side view of a stylus receiving touch input as a tap, according to some embodiments of the subject technology.

As shown in FIG. 3, the touch input sensor 200 can extend at least partially within a grip region 104 of the stylus 100. Additionally or alternatively, the touch input sensor 200 can extend to and/or at least partially within a tip 190 of the stylus 100. Additionally or alternatively, the touch input sensor 200 can extend to an end of the stylus 100 that is opposite the tip 190. The touch input sensor 200 can be used to detect contact with or proximity of a finger of the user. Additionally or alternatively, the touch input sensor 200 can be used to detect contact with or proximity of another object, such as a surface to which the stylus is applied. Additionally or alternatively, the stylus 100 can include multiple touch input sensors 200. Each of the multiple touch input sensors 200 can extend within a different portion of the housing 110. The touch input sensors 200 can be spaced apart from each other. At least one of the touch input sensors 200 can extend along the grip region 104. Gestures detected by the separate touch input sensors 200 can be interpreted as different user inputs according to preprogrammed functions to be performed by the stylus 100 and/or an external device upon detection of the user gestures.

The touch input sensor 200 can be used to cause the stylus and/or the external device to perform one or more functions. While certain examples are provided herein, it will be appreciated that any function of the stylus and/or the external device can be performed according to preprogrammed features of the stylus and/or the external device. The touch input sensor 200 can be used to detect where and whether the user is gripping the stylus 100. The stylus 100 can then enter an idle mode or wake mode based on the grip detection. Additionally or alternatively, the external device can then enter an idle mode or wake mode based on grip detection at the stylus. The touch input sensor 200 can be used to change, select, and/or display one or more settings of the stylus and/or the external device. For example, the touch input sensor 200 can detect gestures and transmit a signal to the external device to change, select, and/or display one or more settings that affect performance of the stylus and/or the external device. The setting can relate to a characteristic (e.g., color, size, width, thickness, shape, etc.) of a marking produced by use of the stylus with the external device As further shown in FIG. 3, the touch input sensor 200 can be used to detect a tap, double tap, triple tap, or another tap gesture by the user. For example, as a user applies a finger at the grip region 104, the stylus 100 can detect the resulting capacitance that is induced in the touch input sensor 200. The user can subsequently lift the finger, and the stylus 100 can detect the resulting capacitance or change in capacitance that is induced in the touch input sensor 200. The user can subsequently return the finger to the grip region 104, and the stylus 100 can detect the resulting capacitance or change in capacitance that is induced in the touch input sensor 200. The sequence of inputs within a span of time can be interpreted by the stylus 100 as a user's tap gesture. Detected tap gestures can be correlated with preprogrammed functions to be performed by the stylus 100 and/or an external device upon detection of the tap gestures. For example, one or more taps can be interpreted as a user input to change a characteristic (e.g., color, size, width, thickness, shape, etc.) of a marking produced by use of the stylus with the external device. By further example, one or more taps can be interpreted as a user input to perform functions on the external device, such as a copy function, a paste function, an undo function, and/or a redo function. By further example, one or more taps can be interpreted as a user input to change a tool (e.g., drawing, erasing, etc.) setting for generating markings on the external device.

Figure 4:
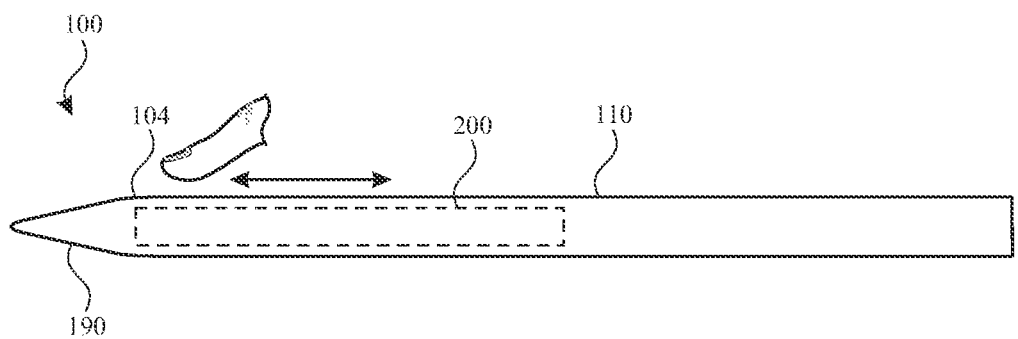
FIG. 4 illustrates a side view of a stylus receiving touch input as a slide, according to some embodiments of the subject technology.

As shown in FIG. 4, the touch input sensor 200 can be used to detect a sliding gesture by the user. Multiple touch input sensing elements of the touch input sensor 200 along the grip region can be used in concert to detect particular user inputs. For example, as a user applies a finger at a first part of the grip region, the touch input sensor 200 of the stylus 100 can detect the resulting capacitance that is induced in a corresponding first touch input sensing element of the touch input sensor 200. The user can subsequently move the finger to a second part of the grip region 104, and the touch input sensor 200 of the stylus 100 can detect the resulting capacitance that is induced in the corresponding second touch input sensing element of the touch input sensor 200. For longitudinal sliding gestures, the corresponding touch input sensing elements can be those that are distributed longitudinally within the housing 110. The sequence of inputs within a span of time can be interpreted by the stylus 100 as a user's motion gesture in a particular direction (e.g., in a longitudinal direction along a line or path defined by the longitudinal distribution of the touch input sensing elements). For example, the sequence of (1) a detected capacitance in the first touch input sensing element and then (2) a detected capacitance and the second touch input sensing element can be interpreted as a user motion gesture in a first direction. The sequence of (1) a detected capacitance and the second touch input sensing element and then (2) a detected capacitance in the first touch input sensing element can be interpreted as a user motion gesture in a second direction, opposite the first direction. Detected sliding gestures can be correlated with preprogrammed functions to be performed by the stylus 100 and/or an external device upon detection of the sliding gestures. For example, longitudinal or other sliding gestures can be interpreted as a user input to change a characteristic (e.g., color, size, width, thickness, shape, etc.) of a marking produced by use of the stylus with the external device. By further example, longitudinal or other sliding gestures can be interpreted as a user input to perform functions on the external device, such as a copy function, a paste function, an undo function, and/or a redo function.

The stylus 100 can include a compressive force sensor 290 within the housing 110. The compressive force sensor 290 can extend along at least a portion of a length of the stylus 100. For example, the compressive force sensor 290 can be positioned at any of the locations described herein with respect to the touch input sensor 200. In some embodiments, the touch input sensor 200 and the compressive force sensor 290 are overlapping and/or coextensive. In some embodiments, the touch input sensor 200 and the compressive force sensor 290 are not overlapping or are overlapping but not coextensive.

Figure 5:
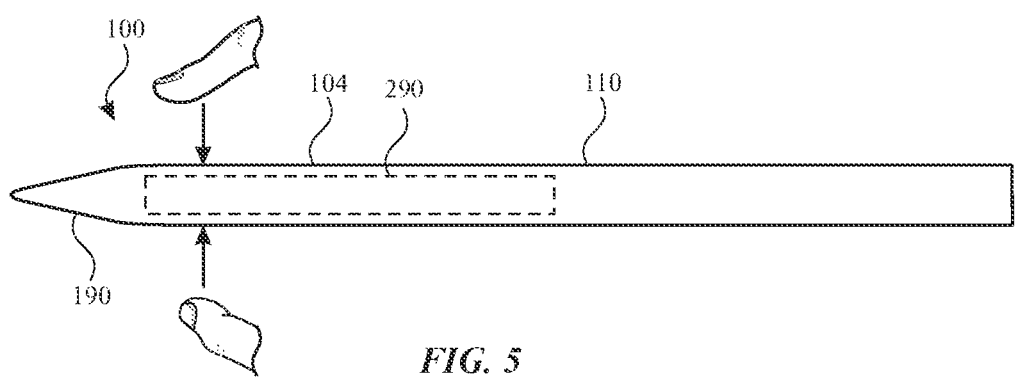
FIG. 5 illustrates a side view of a stylus receiving compressive force input, according to some embodiments of the subject technology.

As shown in FIG. 5, the compressive force sensor 290 can be used to detect squeezing, deflecting, and/or compressing of the stylus 100 to provide an alternative or additional input to the external device 90. In some embodiments, the stylus 100 can receive inputs from the user 10 at a location of the user's grip by the user compressing or squeezing the stylus 100. During operation, the squeezing, deflecting, and/or compressing input received by the stylus 100 can allow the user to control on screen or off screen operations of the external device 90. For example, by squeezing portions of the stylus 100, the external device 90 can provide context sensitive actions, program switching, tool switching, confirmation of actions, etc. In some embodiments, the squeezing, deflecting, or compressing input received by the stylus 100 can be used in conjunction with the position of the stylus 100 and/or the tip 190 relative to the external device 90 to control the operation of the external device 90. The input detected by the compressive force sensor 290 can be interpreted as a different input than the input detected by the touch input sensor 200, regardless of whether the inputs are received at the same location.

It will be appreciated that the touch input sensor 200 and the compressive force sensor 290 can be used to detect combinations of gestures, including tap gestures, sliding gestures, squeezing gestures, and/or other gestures. For example a sequence of different gestures in combination can be interpreted by the stylus 100 as a particular input by the user.

Figure 6:
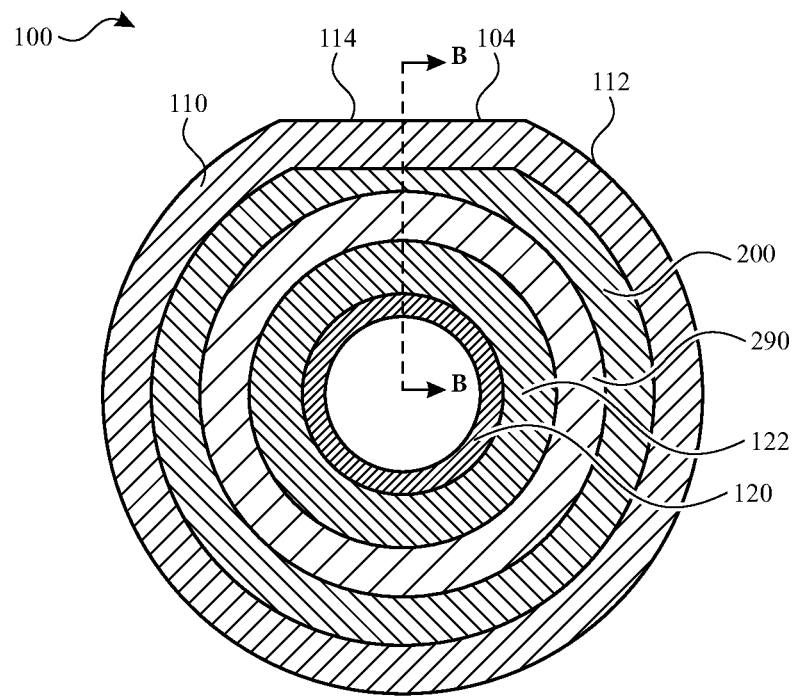
FIG. 6 illustrates a front sectional view of the section A-A of the stylus of FIG. 2, according to some embodiments of the subject technology.
Figure 7:
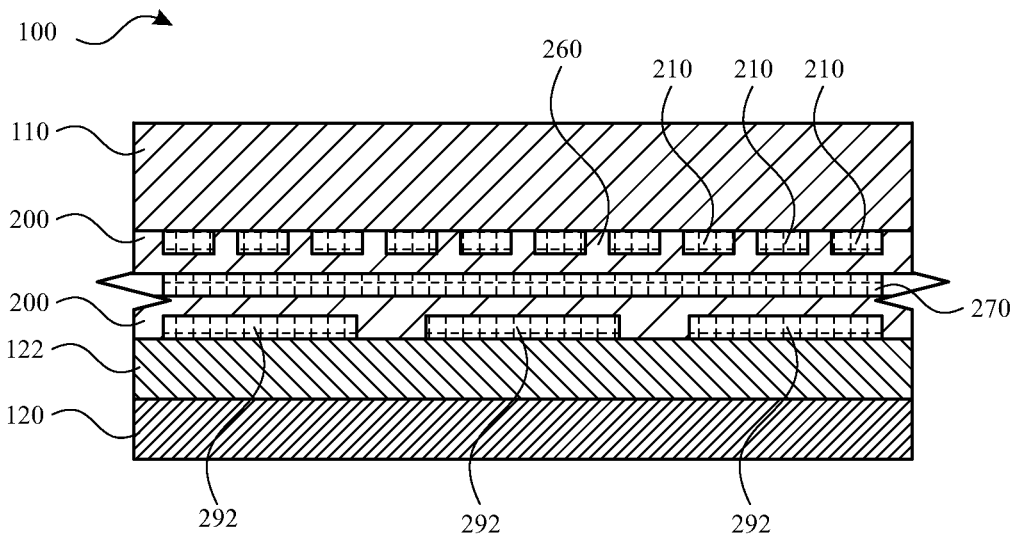
FIG. 7 illustrates a side sectional view of the section B-B of the stylus of FIG. 6, according to some embodiments of the subject technology.

Referring now to FIGS. 6 and 7, the stylus 100 can include multiple layers that extend along at least some of the longitudinal length of the stylus 100 while radially overlapping each other. FIG. 6 illustrates a front sectional views of the stylus 100, according to some embodiments of the subject technology. The stylus 100 can receive different types of tactile input from the user at the user grip region 104 with the touch input sensor 200 and the compressive force sensor 290. The touch input sensor 200 can be positioned radially between a support member 120 and the housing 110 of the stylus 100. The compressive force sensor 290 can also be positioned radially between a support member 120 and the housing 110 of the stylus 100. In particular, the compressive force sensor 290 can be positioned radially between the touch input sensor 200 and the support member 120, and the touch input sensor 200 can be positioned radially between the compressive force sensor 290 and the housing 110.

An elastic insert 122 can be included with the compressive force sensor 290 and/or positioned between the compressive force sensor 290 and the support member 120. With the elastic insert 122 positioned radially between the support member 120 and the compressive force sensor 290, the elastic insert 122 can bias the touch input sensor 200 and the compressive force sensor 290 radially outwardly against the housing 110.

The housing 110 can be curved along some or all of an inner and/or outer surface. The housing 110 can be flat along some or all of an inner and/or outer surface. The touch input sensor 200 and the compressive force sensor 290 can generally conform to the outer shape of the support member 120 and/or an elastic insert 122. Additionally or alternatively, the touch input sensor 200 can generally conform to the inner shape of the housing 110, which may include flat and/or curved surfaces. Where the touch input sensor 200 does not directly contact the inner surface of the housing 110, the touch input sensor 200 can maintain a constant distance with respect to the housing 110, so that the presence of a finger on the housing 110 is reliably detectable by the touch input sensor 200.

The touch input sensor 200 and/or the compressive force sensor 290 can be provided initially as a sheet or substantially flat article that is flexible and bendable. As shown in FIG. 7, the touch input sensor 200 can include multiple touch input sensing elements 210 along a sensing region of the touch input sensor 200. The touch input sensing elements 210 can be arranged in a pattern or grid that includes multiple rows and/or columns.

As shown in FIG. 7, the touch input sensor 200 can include multiple touch input sensing elements 210 distributed along a longitudinal length of the stylus 100 at the grip region 104. For example, the touch input sensing elements 210 shown in FIG. 7 are distributed longitudinally so that each touch input sensing element 210 of a given column faces outwardly at a different portion of the housing 110. The touch input sensor 200 can include 1, 2, 3, 4, 5, 6, 7, 8, 9, 10, or more than 10 touch input sensing elements 210 along a longitudinal length. The distribution of touch input sensing elements 210 provides independent sensing capabilities at multiple locations along the longitudinal length of the stylus 100 at the grip region 104.

The touch input sensor 200 can include multiple touch input sensing elements 210 distributed circumferentially. For example, the touch input sensing elements 210 can be distributed circumferentially so that each touch input sensing element 210 of a given row faces radially outwardly at a different portion of the housing 110. The touch input sensor 200 can include 1, 2, 3, 4, 5, 6, 7, 8, 9, 10, or more than 10 touch input sensing elements 210 about a circumference. The distribution of touch input sensing elements 210 provides independent sensing capabilities at multiple locations about the circumference of the stylus 100 at the grip region 104.

As further shown in FIG. 7, the compressive force sensor 290 can include multiple compressive force sensing elements 292 along a sensing region of the compressive force sensor 290. The compressive force sensing elements 292 can be arranged in a pattern or grid that includes multiple rows and/or columns.

As shown in FIG. 7, the compressive force sensor 290 can include multiple compressive force sensing elements 292 distributed along a longitudinal length of the stylus 100 at the grip region 104. For example, the compressive force sensing elements 292 shown in FIG. 7 are distributed longitudinally so that each compressive force sensing element 292 of a given column faces outwardly at a different portion of the housing 110. The compressive force sensor 290 can include 1, 2, 3, 4, 5, 6, 7, 8, 9, 10, or more than 10 compressive force sensing elements 292 along a longitudinal length. The distribution of compressive force sensing elements 292 provides independent sensing capabilities at multiple locations along the longitudinal length of the stylus 100 at the grip region 104. However, it will be understood that, in some embodiments, only one compressive force sensing element 292 may be provided in a given column (e.g., extending along or parallel to a longitudinal length). As such, multiple touch input sensing elements 210 can be provided in a position that overlaps a single compressive force sensing element 292.

The compressive force sensor 290 can include multiple compressive force sensing elements 292 distributed circumferentially. For example, the compressive force sensing elements 292 can be distributed circumferentially so that each compressive force sensing element 292 of a given row faces radially outwardly at a different portion of the housing 110. The compressive force sensor 290 can include 1, 2, 3, 4, 5, 6, 7, 8, 9, 10, or more than 10 compressive force sensing elements 292 about a circumference. The distribution of compressive force sensing elements 292 provides independent sensing capabilities at multiple locations about the circumference of the stylus 100 at the grip region 104. It will be understood that, in some embodiments, the number of compressive force sensing elements 292 within a row (e.g., extending circumferentially or about an axis) may be equal to the number of touch input sensing elements 210 within the same row. Such a configuration can facilitate detection of compression forces on opposing radial sides of the stylus.

Figure 8:
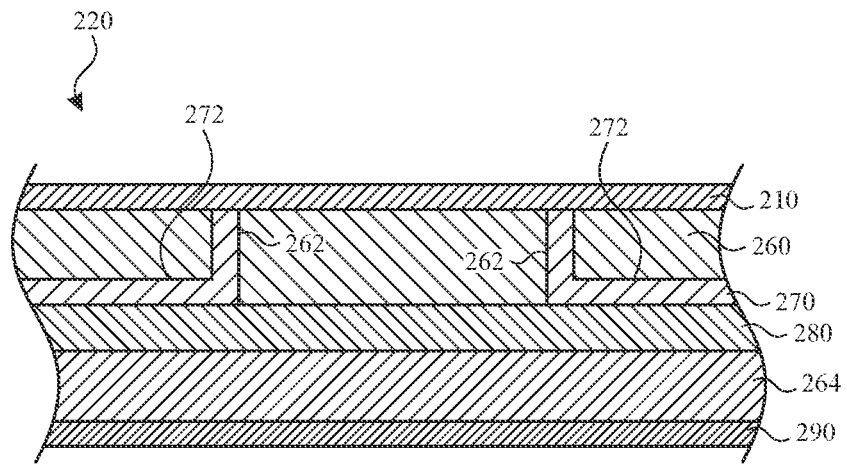
FIG. 8 illustrates a sectional view of a portion of a touch input sensor, according to some embodiments of the subject technology.

As shown in FIG. 8, a sensing region 220 can include components of the touch input sensor 200 and the compressive force sensor 290 in different layers thereof. At a surface of the sensing region 220, one or more compressive force sensing elements 292 can be positioned to detect user touch inputs. The compressive force sensing elements 292 can include one or more conductive portions defining touch input sensing elements and/or grounded regions for detecting capacitance there between. The sensing region 220 can include an overlay or other surface feature for interacting with the housing of the stylus. Beneath the compressive force sensing elements 292, the sensing region 220 includes a first substrate 260 and a routing layer 270. The first substrate 260 electrically insulates the compressive force sensing elements 292 from the routing layer 270. The routing layer 270 can include one or more conductive traces 272. Each of the traces 272 electrically connects to the compressive force sensing elements 292 with a corresponding via 262 that extends through the first substrate 260, as discussed further herein.

The sensing region 220 can further include one or more compressive force sensing elements 292. The compressive force sensing elements 292 can include a metal or another conductive material. A second substrate 264 electrically insulates the routing layer 270 from the compressive force sensing elements 292. The second substrate 264 can be coupled to the routing layer 270 with an adhesive layer 280. The compressive force sensing elements 292 can be electrically connected to the routing layer 270 with vias (not shown) or otherwise connected to other components with connections at ends thereof. For example, where each compressive force sensing element 292 defines an entire column, the entire compressive force sensing element 292 can provide a connection at an end thereof such that vias through substrate layers are not required. It will be recognized that additional layers can be provided while maintaining the functions of the sensing region 220 as described herein.

Figure 9:
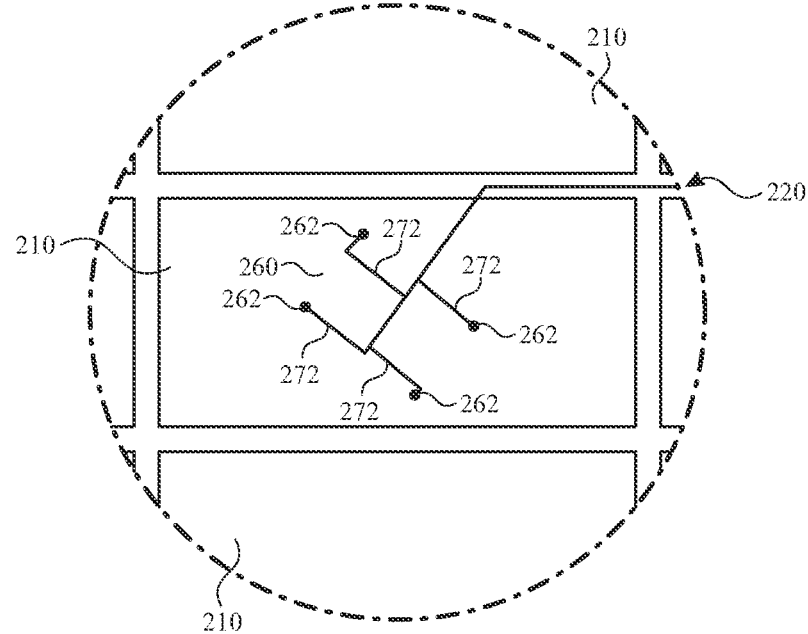
FIG. 9 illustrates a bottom view of a portion of a touch input sensor the touch input sensor of FIG. 8, according to some embodiments of the subject technology.

As shown in FIG. 9, for any given touch input sensing element, the traces 272 of the sensing region 220 can provide multiple connections to vias 262 of the first substrate 260. For example, multiple traces 272 can branch from a single connector to extend to different locations along the first substrate 260. Each of the traces 272 can electrically connect to a via 262. For each touch input sensing element, 1, 2, 3, 4, 5, 6, 7, 8, 9, 10, or more than 10 traces and vias can be provided. The vias 262 can be distributed at different locations along the first substrate 260. Each trace 272 can approach its corresponding via 262 in a different direction than a direction of at least one other trace 272. For example, as shown in FIG. 9, each of the four traces 272 extends in a different direction. The directions of the four traces 272 of FIG. 9 are, in some pairings, orthogonal to each other. It will be understood that other varieties of directions are possible.

The different orientations for the traces 272 provide redundant protection against incidental breakage of the connection to the vias 262. For example, during assembly of the stylus, the touch input sensor 200 can be wrapped from a flat shape to a curved shape. The assembly process can apply stress and strain to the connections between the traces 272 and the vias 262. Where the strain is in particular directions, only some of the connections may be affected. Accordingly, incidental breakage of one connection due to stress during assembly can leave other connections intact. As long as one or more connections remain, the touch input sensing element can maintain electrical connection to a controller through the intact trace and via connection(s).

It will be understood that such a configuration of vias can be applied to connections to the compressive force sensing elements 292 as needed.

Figure 10:
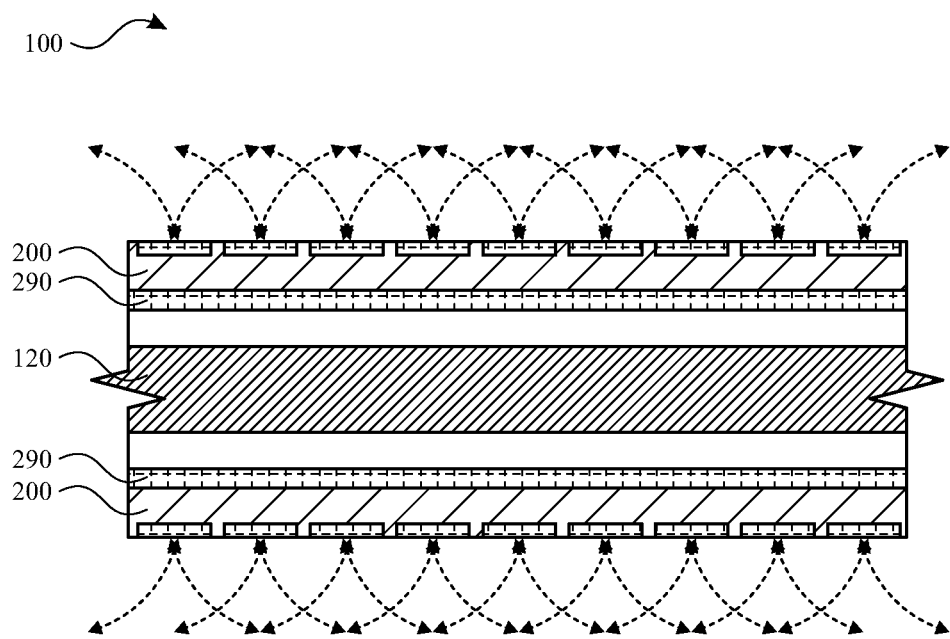
FIG. 10 illustrates a side sectional view a stylus operating a touch input sensor for detecting touch input, according to some embodiments of the subject technology.

FIG. 10 illustrates a side sectional view a stylus operating a touch input sensor for detecting touch input, according to some embodiments of the subject technology. As shown in FIG. 10, the touch input sensor 200 can include multiple touch input sensing elements that operate as self-capacitive touch input sensors and/or mutual-capacitive touch input sensors. For example, as a self-capacitive touch input sensor, the touch input sensor 200 can measures changes in capacitance with respect to ground by projecting electric fields in multiple directions as shown in FIG. 10. Ground or driven (active) shielding can be provided by the routing layer or another shield within the touch input sensor 200. As such, the touch input sensor 200 can measures changes in capacitance with respect to ground, where a touch input from a user causes the capacitance to increase. By further example, as a mutual-capacitive touch input sensor, the touch input sensor 200 can measure a change in capacitance between two different touch input sensor elements. Touch input from the user modifies the field between the two touch input sensor elements and reduces the capacitive coupling between the touch input sensor elements.

Figure 11:
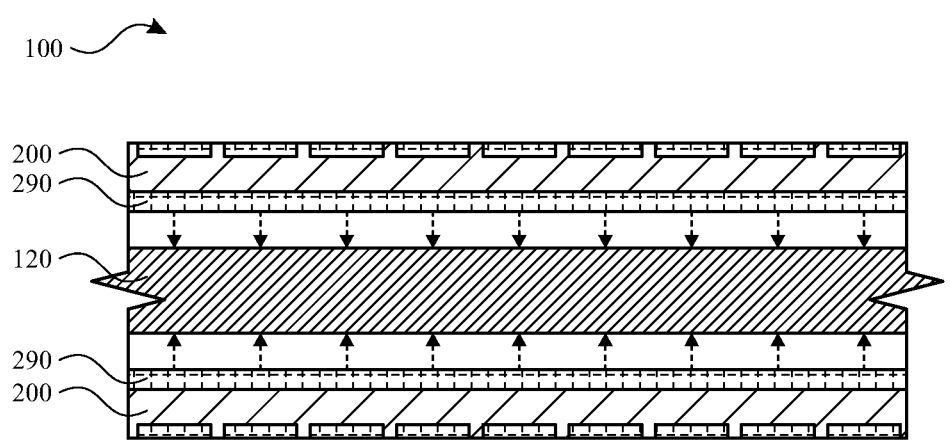
FIG. 11 illustrates a side sectional view a stylus operating a compressive force sensor for detecting compressive force input, according to some embodiments of the subject technology.

FIG. 11 illustrates a side sectional view a stylus operating a compressive force sensor for detecting compressive force input, according to some embodiments of the subject technology. As shown in FIG. 11, a compressive force on the housing or other exterior surface of the stylus 100 can be transmitted (e.g., through the touch input sensor 200) to the compressive force sensor 290 to press the compressive force sensor 290 radially inwardly toward the support member 120. The support member 120 can provide sufficient rigidity to maintain its position, such that the compressive force moves, deforms, and/or deflects the compressive force sensor 290 and reduces the distance between the compressive force sensor 290 and the support member 120. Accordingly, the capacitance between the compressive force sensor 290 and the support member 120 can be altered in a manner that is measurable. The measured change in capacitance can be correlated with a reduction in the distance between the compressive force sensor 290 and the support member 120 as well as the magnitude of the compressive force. As such, the compressive force input can be interpreted as an analog input that can produce a corresponding analog signal to and/or from the stylus and/or the external device. An elastic insert can be provided between the compressive force sensor 290 and the support member 120 to act as a dielectric and/or bias the compressive force sensor 290 radially outwardly away from the support member 120.

Figure 12:
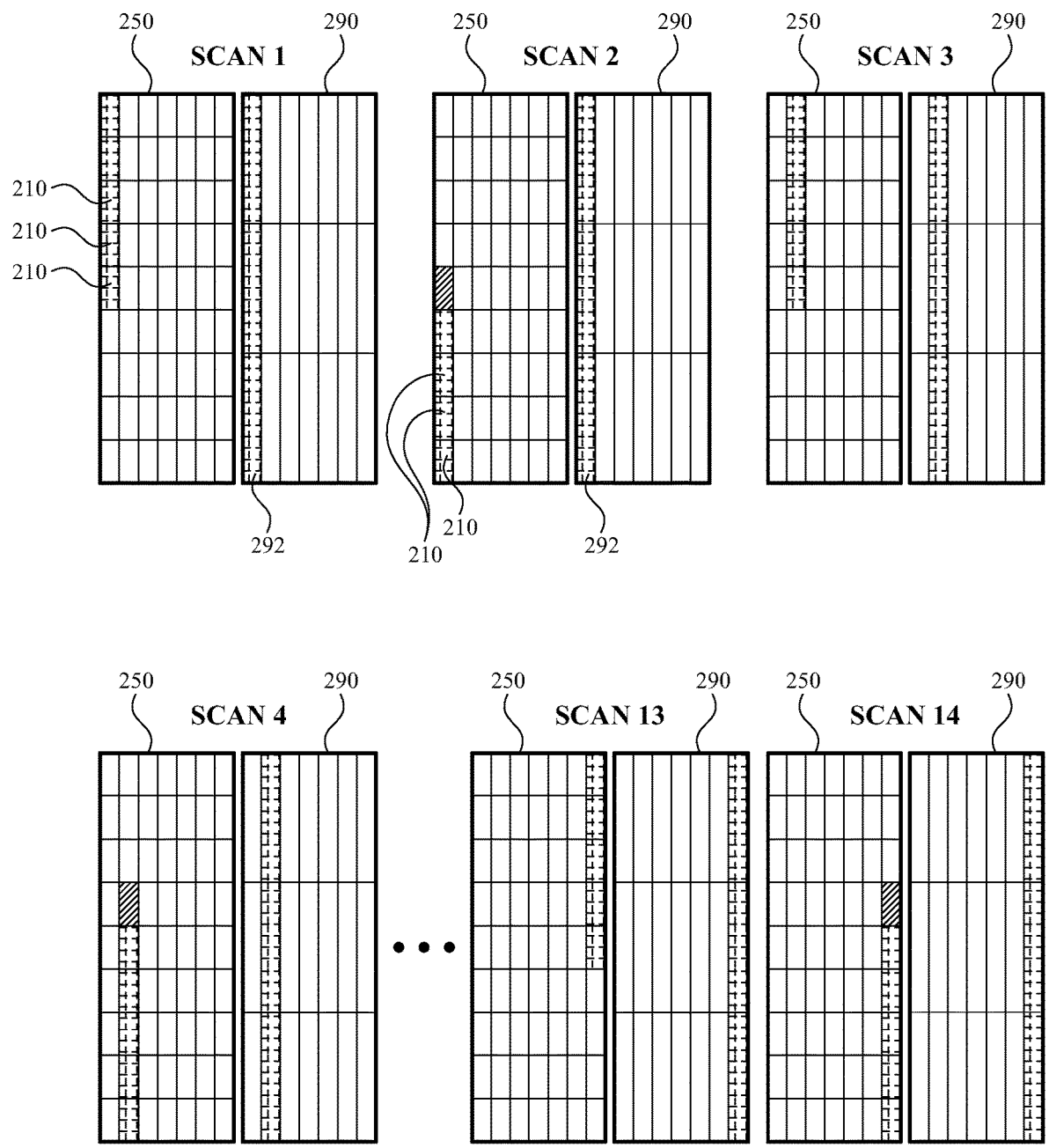
FIG. 12 illustrates a series of scans for a touch input sensor and a compressive force sensor of a stylus, according to some embodiments of the subject technology.

FIG. 12 illustrates a series of scans for a touch input sensor and a compressive force sensor of a stylus, according to some embodiments of the subject technology. Each of the scans shows the same touch input sensor and compressive force sensor, with a different set of the sensing elements of each being driven and/or read in each of the scans. It will be understood that the sensors and sensing elements are illustrated schematically as grids having one or more rows and/or columns, but that when incorporated into a stylus the sensors can wrap circumferentially and extend longitudinally within a housing, as described herein.

Time-division multiplexing can be utilized to drive and/or measure subsets of the sensing elements of the different types of sensors. For example, in Scan 1, at least some of the touch input sensing elements 210 of the touch input sensor 200 are driven to a given potential and operated to measure capacitance (e.g., by self-capacitive and/or mutual-capacitive methods). In the same scan, at least some of the compressive force sensing elements 292 of the compressive force sensor 290 are driven to a given potential and operated to measure capacitance (e.g., between the compressive force sensor 290 and a support member). The potential at which the touch input sensing element(s) 210 of the touch input sensor 200 and the compressive force sensing element(s) 292 of the compressive force sensor 290 are driven can be the same potential. This can facilitate simultaneous driving and, optionally, measurement of the different sensing elements. As shown in Scan 1, the driven touch input sensing element(s) 210 of the touch input sensor 200 and the driven compressive force sensing element(s) 292 of the compressive force sensor 290 can be overlapping sensing elements. Such an overlap can occur when the sensing elements are positioned in the same column (e.g., extending along or parallel to a longitudinal length of the stylus).

However, not all of the driven touch input sensing element(s) 210 of the touch input sensor 200 and the driven compressive force sensing element(s) 292 of the compressive force sensor 290 of a given scan need be driven and/or measured within the same scan. For example, in Scan 2, at least some of the touch input sensing element(s) 210 of the touch input sensor 200 that are driven were not driven in Scan 1, despite being in the same column. At least one of the touch input sensing elements 210 of the touch input sensor 200 driven in a subsequent scan can be one that was driven in an immediately previous scan. Optionally, such a touch input sensing element 210 can be driven without being measured to operate as a buffer pixel. In Scan 2, the same compressive force sensing element(s) 292 of the compressive force sensor 290 that was driven and/or measured in Scan 1 can be driven and/or measured again in Scan 2, as it overlaps with the touch input sensing element(s) 210 of the touch input sensor 200 that are driven and/or measured in Scan 2. Again, the driven and/or measured sensing elements in any given scan can be driven to the same potential.

In some embodiments, when any particular sensing element is not being driven, that sensing element can be connected to ground. For example, touch input sensing elements 210 of the touch input sensor 200 that are not driven in any given scan can be connected to ground to provide a shielding ground layer to enhance sensitivity and accuracy of the compressive force sensor 290

In Scans 3 and 4, at least some of the touch input sensing elements 210 of the touch input sensor 200 and compressive force sensing elements 292 of the compressive force sensor 290 of a different column are driven and/or measured. It will be understood that such a process can be implemented for separate rows (e.g., extending circumferentially or about an axis of the stylus), where the driven and/or measured sensing elements are overlapping in the same row.

The scans can continue as described herein until all sensing elements of all columns and/or rows have been driven and/or measured. Optionally, the scans can commence again with Scan 1 for continuous or intermittent cycling. Alternatively, additional scans can be performed before cycling again, as described further herein.

Figure 13:
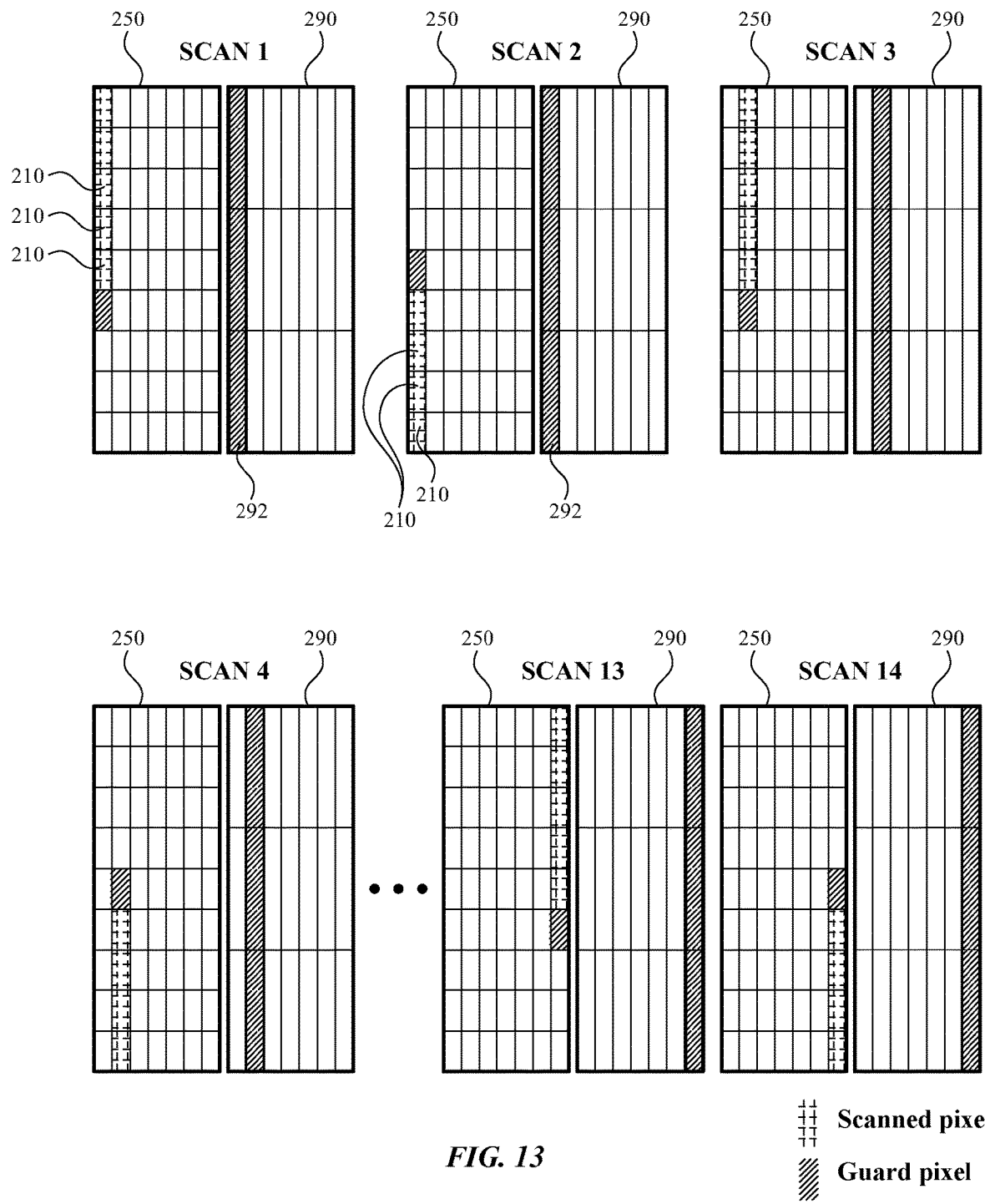
FIG. 13 illustrates a series of scans for a touch input sensor and a compressive force sensor of a stylus, according to some embodiments of the subject technology.

FIG. 13 illustrates a series of additional scans for the touch input sensor and the compressive force sensor of the stylus, according to some embodiments of the subject technology. As with FIG. 12, each of the additional scans shows the same touch input sensor and compressive force sensor, with a different set of the sensing elements of each being driven and/or read in each of the scans.

As shown, a number of the compressive force sensing elements 292 touch input sensing elements 210 can be driven and read and/or measured as scanned pixels in one or more of the scans. In any one of the scans, a number of the touch input sensing elements 210 compressive force sensing elements 292 can be driven but not read and/or measured as guard pixels. The guard pixels can overlap with the scanned pixels in any one of the scans. In such operation, the guard pixels shield the scanned pixels from interference and to prevent each of the scanned pixels from sensing a different ground value. In addition to or as an alternative to the touch input sensing elements 210 compressive force sensing elements 292 operating as guard pixels, one or more of the touch input sensing elements 210 can be operated as guard pixels. For example, a touch input sensing elements 210 adjacent to those acting as scanned pixels can be operated as a guard pixel. The touch input sensing elements 210 operating as a guard pixel in one scan can be operated as a scanned pixel in another (e.g., subsequent) scan.

Figure 14:
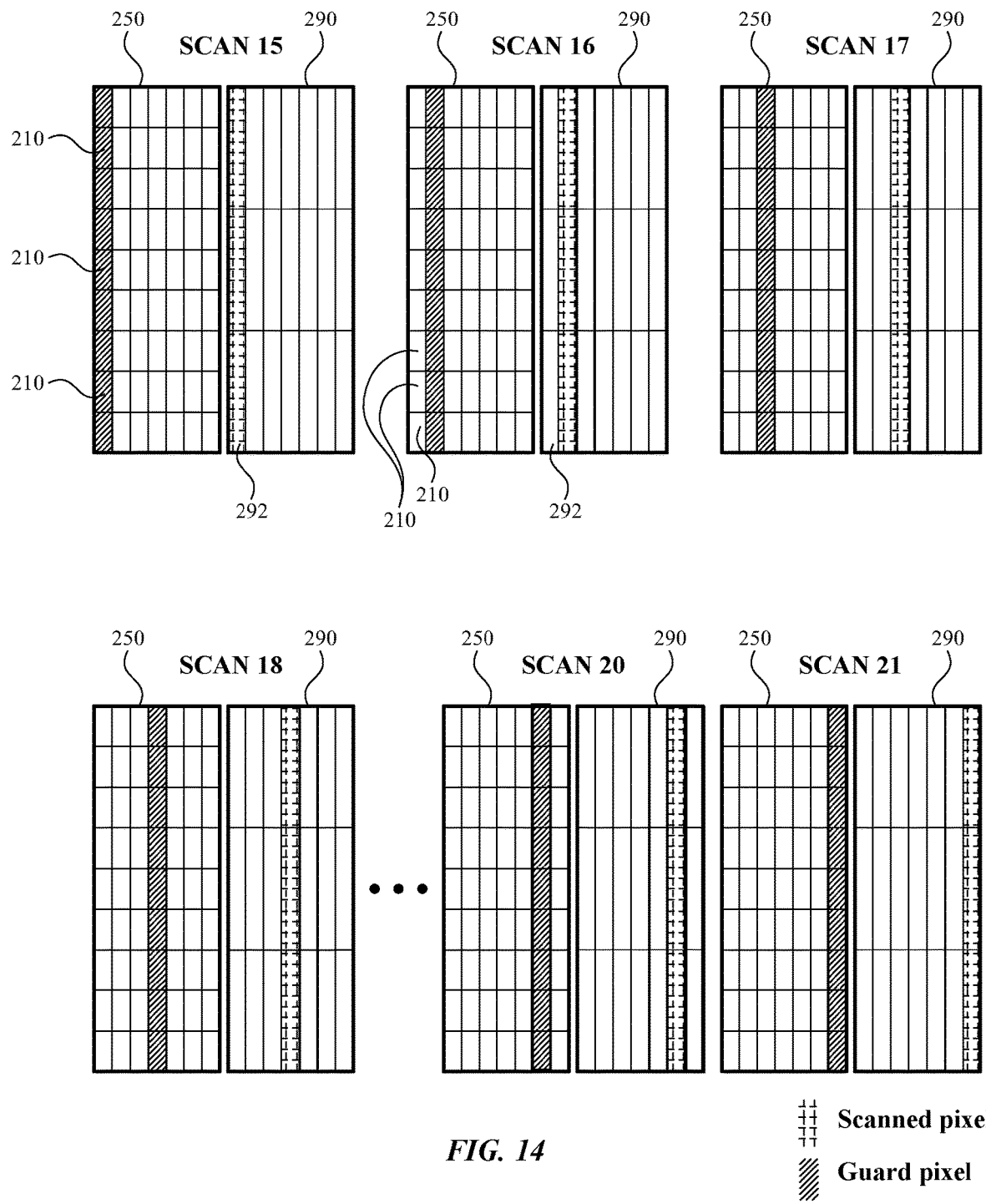
FIG. 14 illustrates a series of scans for a touch input sensor and a compressive force sensor of a stylus, according to some embodiments of the subject technology.

FIG. 14 illustrates a series of additional scans for the touch input sensor and the compressive force sensor of the stylus, according to some embodiments of the subject technology. As with FIG. 13, each of the additional scans shows the same touch input sensor and compressive force sensor, with a different set of the sensing elements of each being driven and/or read in each of the scans.

As with the preceding scans (i.e., Scans 1-14), additional scans, such as Scans 15-21, can employ time-division multiplexing to drive and/or measure subsets of the sensing elements of the different types of sensors. For example, in Scan 15, at least some of the compressive force sensing elements 292 of the touch input sensor 200 are driven to a given potential and operated to measure capacitance (e.g., by self-capacitive and/or mutual-capacitive methods). The number of compressive force sensing elements 292 driven in the additional scans can be greater than the number driven in the preceding scans. For example, an entire row and/or column of compressive force sensing elements 292 can be driven in the additional scans, as opposed to fewer than those of an entire row and/or column in the preceding scans. In the same scan (e.g., Scan 15), at least some of the touch input sensing elements 210 of the compressive force sensor 290 are driven as guard pixels to a given potential (e.g., the same potential as that of the compressive force sensing elements 292) but not measured. As shown in Scan 15, the driven touch input sensing element(s) 210 of the touch input sensor 200 and the driven compressive force sensing element(s) 292 of the compressive force sensor 290 can be overlapping sensing elements. For example, an entirety of each of overlapping columns and/or rows can be driven simultaneously in the additional scans. In such operation, the guard pixels shield the scanned pixels from interference and to prevent each of the scanned pixels from sensing a different ground value. In some embodiments, when any particular sensing element is not being driven, that sensing element can be connected to ground.

Figure 15:
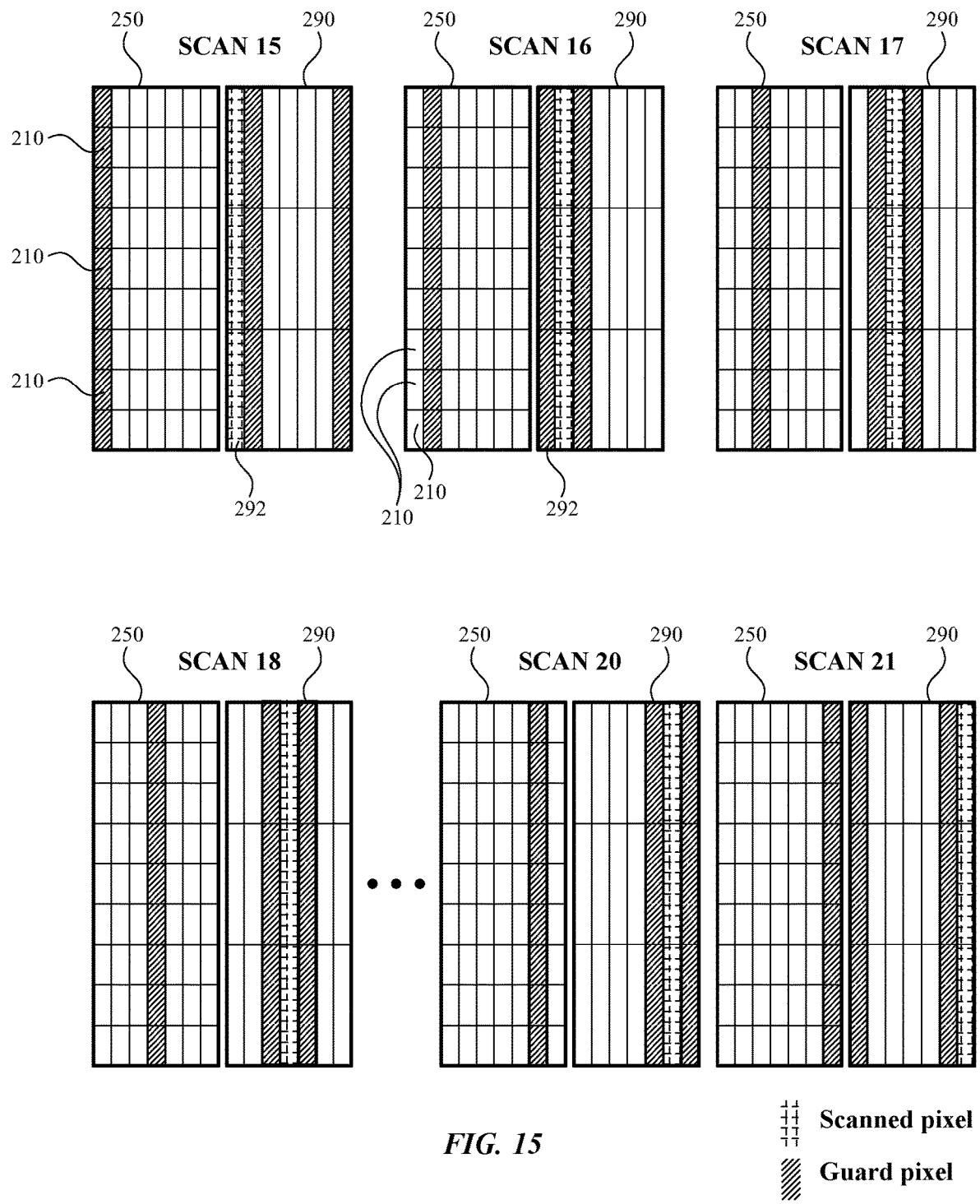
FIG. 15 illustrates a series of scans for a touch input sensor and a compressive force sensor of a stylus, according to some embodiments of the subject technology.

FIG. 15 illustrates another series of additional scans for the touch input sensor and the compressive force sensor of the stylus, according to some embodiments of the subject technology. As with FIG. 13, each of the additional scans shows the same touch input sensor and compressive force sensor, with a different set of the sensing elements of each being driven and/or read in each of the scans.

As with the preceding scans (i.e., Scans 1-14), additional scans, such as Scans 15-21, can employ time-division multiplexing to drive and/or measure subsets of the sensing elements of the different types of sensors. For example, in Scan 15, at least some of the compressive force sensing elements 292 of the touch input sensor 200 are driven as scanned pixels to a given potential and operated to measure capacitance (e.g., by self-capacitive and/or mutual-capacitive methods). In the same scan (e.g., Scan 15), at least some of the touch input sensing elements 210 of the compressive force sensor 290 are driven as guard pixels to a given potential (e.g., the same potential as that of the compressive force sensing elements 292) but not measured. As shown in Scan 15, the driven touch input sensing element(s) 210 of the touch input sensor 200 and the driven compressive force sensing element(s) 292 of the compressive force sensor 290 can be overlapping sensing elements. For example, an entirety of each of overlapping columns and/or rows can be driven simultaneously in the additional scans. Additionally, other compressive force sensing elements 292 that are adjacent (e.g., on one or more sides) to those operated as scanned pixels can also be operated as guard pixels. In such operation, the guard pixels (both those of the touch input sensing elements 210 and the compressive force sensing elements 292) shield the scanned pixels (e.g., of the compressive force sensing elements 292) from interference and to prevent each of the scanned pixels from sensing a different ground value. In some embodiments, when any particular sensing element is not being driven, that sensing element can be connected to ground.

The scans can continue as described herein until all sensing elements of all columns and/or rows have been driven and/or measured. The scans can commence again with Scan 1 for continuous or intermittent cycling.

Time-division multiplexing can be applied to other activities of the stylus. For example, at least one of wireless communication (e.g., with an external device), touch input sensing, compressive force sensing, and tip input sensing can be suspended while another one of these is being performed. In some embodiments, fewer than all of such activities are performed at any given time. In some embodiments, only one of such activities is performed at any given time. The multiplexing can be performed according to a schedule and/or adapted based on detected conditions.

According to some embodiments, the user can provide touch inputs and/or compressive force inputs to indicate a selection made by the user that is optionally transmitted to the external device. According to some embodiments, the user input can indicate that the external device is to perform a corresponding action in response to subsequent inputs from the stylus 100. For example, the stylus 100 can be used to indicate markings when used on a surface of the external device 90, and the user input can indicate a selection of marking characteristics, such as shape, thickness, and color. According to some embodiments, the user input can select or alter a setting of the external device 90, such as a selection between markings (e.g., drawing mode) or erasing existing markings (e.g., eraser mode).

The stylus and/or an external device can be provided with instructions to perform certain actions upon receipt of the input signal. For example, an external device can interpret receipt of the input signal as a user selection. The subject of the user selection can be further indicated, for example, by contact of the stylus (e.g., the tip of the stylus) on a surface of the external device.

The stylus and/or the external device can provide confirmation upon receipt of a user input. For example, the stylus and/or the external device can provide haptic feedback to the user upon detection that a user input has been provided. By further example, a notification, alert, or alarm can be provided.

The external device can record receipt of the input signal and apply a corresponding action in response to subsequent inputs from the stylus. For example, the stylus can be used for drawing or writing by contacting the surface of the external device with the tip of the stylus. Such input can be recorded by the external device with markings, lines, or shapes having a variety of characteristics. For example, the recorded markings can have a certain shape, thickness, and color. When the user operates the touch input sensor and/or the compressive force sensor to create an input signal, the external device can interpret the input signal as a command to apply one or more characteristics to markings generated by subsequent input from the stylus. Accordingly, subsequent contact between the tip of the stylus and the surface of the external device can be recorded as markings having the one or more characteristics determined by the input signal. According to some embodiments, the input signal generated by operation of the touch input sensor and/or the compressive force sensor can toggle a setting that interprets subsequent inputs as either drawing new markings (e.g., drawing mode) or erasing existing markings (e.g., eraser mode). According to some embodiments, during receipt of an input signal generated by operation of the touch input sensor and/or the compressive force sensor, inputs from the tip of the stylus can be interpreted based on the input signal. For example, an input signal that corresponds to a property of a user input applied to the touch input sensor and/or the compressive force sensor can command the external device to interpret simultaneous inputs from the tip of the stylus with markings that have a characteristic based on the property of the user input. Drawing with the stylus during application of a user input above a threshold or within a higher range can result in thicker markings, and drawing with the stylus during application of a force below the threshold or within a lower range can result in thinner markings. Multiple ranges and thresholds can apply to the detected voltage to provide a range of possible input signals.

The characteristic of the user input can include a direction, pathway, speed, and/or length of a user motion gesture providing the user input. For example, a stylus can track a user motion gesture across multiple touch input sensing elements and detect user inputs applied in sequence to each of the multiple touch input sensing elements. The combined input can be used to detect a direction, pathway, speed, and/or length of the user motion gesture across the multiple touch input sensing elements. The stylus or the external device can interpret the resulting input signal as a command to perform a function in accordance with the characteristic. According to some embodiments, the input signal can change a setting of the external device based on the input signal. For example, the external device can change volume, brightness, display zoom, marking characteristic, or other features of the external device to an extent that is proportionate to the characteristic (e.g., length) of the user motion gesture. For example, applying a user motion gesture in a first direction across the touch input sensing elements can increase a setting value (e.g., volume, marking thickness, etc.) of the external device, and applying a user motion gesture across the touch input sensing elements in a second direction, opposite the first direction, can decrease the setting value of the external device.

As discussed above, from any of the modes, the stylus can detecting that the user is not holding the stylus. Accordingly, the stylus can enter an idle mode of the stylus. While the stylus is in the idle mode, the stylus can reject detections by the touch input sensor and/or the compressive force sensor as user inputs.

Figure 16:
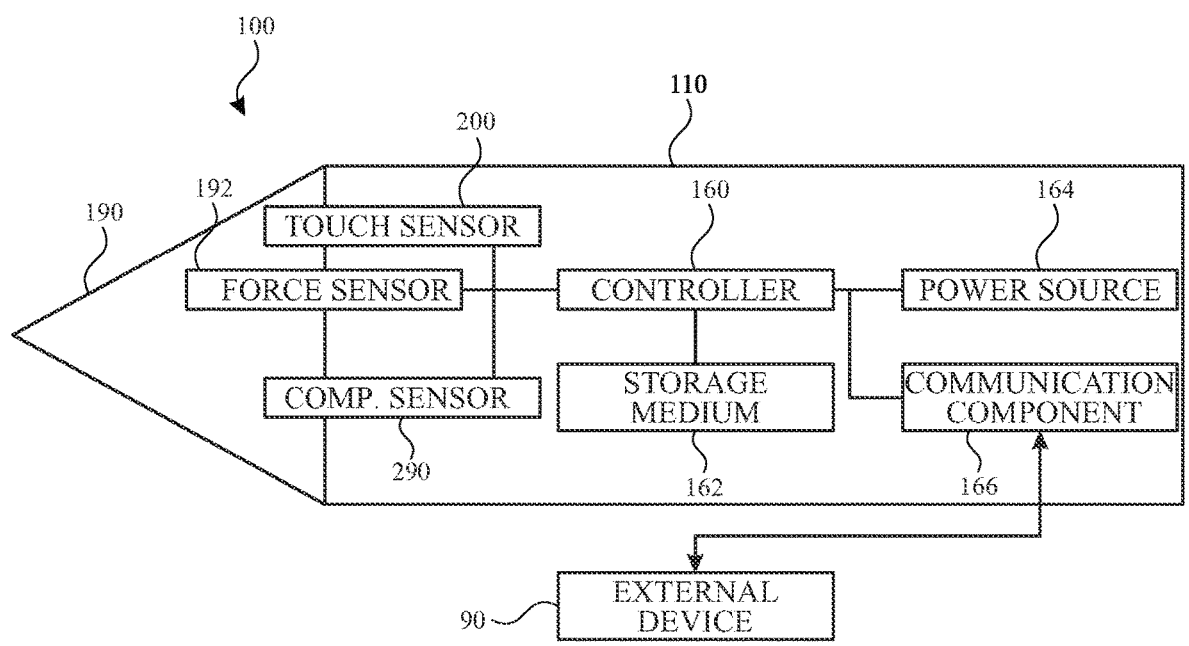
FIG. 16 illustrates a block diagram illustrating a stylus and an external device, according to some embodiments of the subject technology.

As shown in FIG. 16, the stylus 100 can include components that support handling and operation by a user. Inputs can be provided by a user at one or more components of the stylus 100.

A force sensor 192 can be operated to detect user inputs at the tip 190 of the stylus 100. The force sensor 192 can interact with both the tip 190 and the housing 110 to detect relative motion of the tip 190 and the housing 110. For example, the force sensor 192 can be operated to detect when the tip 190 is contacting a surface, such as the surface of the external device 90. The detection can be based on movement of the tip 190 relative to the housing 110. Accordingly, the force sensor 192 can be directly or indirectly connected to both the tip 190 and the housing 110 to detect relative motion there between. The force sensor 192 can include a component that converts mechanical motion of the tip 190 into an electric signal. The force sensor 192 can include one or more contact sensors, capacitive sensors, touch input sensors, strain gauges, cameras, piezoelectric sensors, pressure sensors, photodiodes, and/or other sensors. The force sensor 192 can detect both the presence and magnitude of a force.

In use, a user may manipulate the stylus 100 and apply a force to a surface of the external device 90. A corresponding reaction force may be transferred through the tip 190 of the stylus 100 connected to an electromechanical coupling and to the force sensor 192 of the stylus 100. The force sensor 192, or a portion thereof, may deform in response which may be measured and used to estimate the applied force. The force sensor 192 can be used to produce a non-binary output that corresponds to the applied force. For example, the force sensor 192 can be used to produce an output that represents a magnitude that varies in accordance with a variable amount of applied force.

A touch input sensor 200 can be provided to detect contact by a user on a grip region of the housing 110 of the stylus 100. The touch input sensor 200 can include a capacitive touch input sensor, such as a self-capacitance sensor. As described further herein, the touch input sensor 200 can include multiple touch input sensing elements, such as conductive electrodes, to detect contact and changes in contact at multiple locations.

A compressive force sensor 290 can be provided to detect compressive forces by a user on a grip region of the housing 110 of the stylus 100. The compressive force sensor 290 can include a capacitive gap sensor, as a pair of sensing elements separated by a dielectric material (e.g., elastic insert). As described further herein, the touch input sensor 200 can include multiple compressive force sensing elements, such as conductive electrodes, to detect compressive forces at multiple locations.

As further shown in FIG. 16, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

As further shown in FIG. 16, the stylus 100 can include a power source 164, such as one or more batteries and/or power management units. The stylus 100 can include components for charging the power source 164.

As further shown in FIG. 16, the stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. The stylus 100 can detect motion characteristics of the stylus 100 with a motion sensor such as an accelerometer, a gyroscope, a global positioning sensor, a tilt sensor, and so on for detecting movement and acceleration of the stylus 100. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the external device 90 to adjust or update the operation thereof.

The external device 90 can also include components that facilitate operation of the stylus 100. For example, the external device 90 can include one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on. In some embodiments, a communication interface of the external device 90 facilitates electronic communications between the external device 90 and the stylus 100.

Accordingly, embodiments of the present disclosure provide a stylus or other tactile-based input device that can receive different types of tactile input from a user. The tactile input sensing functions can be performed by a touch input sensor, such as a capacitive sensing device, and a compressive force sensor, such as a capacitive gap sensor. A touch input sensor can be integrated into an input device in a low profile form and overlap the compressive force sensor so that both touch input and compressive force input can be detected in the same regions of the stylus. Both types of tactile input can be received at the user's natural grip location.

While some embodiments of tactile input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a tactile input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various examples of aspects of the disclosure are described below as clauses for convenience. These are provided as examples, and do not limit the subject technology.

Clause A: a stylus comprising: a support member; an elastic insert positioned about the support member; a compressive force sensor positioned about the elastic insert; a touch input sensor positioned about the compressive force sensor; and a housing positioned about the touch input sensor.

Clause B: a stylus comprising: a support member; a housing positioned; a compressive force sensor between the support member and the housing and comprising multiple compressive force sensing elements, wherein each of the compressive force sensing elements is configured to provide a first output indicating a corresponding distance between the compressive force sensor and the support member; and a touch input sensor between the support member and the housing and comprising multiple touch input sensing elements, wherein each of the touch input sensing elements is configured to provide a second output indicating when a user is contacting a corresponding portion of the housing.

Clause C: a stylus comprising: a compressive force sensor comprising compressive force sensing elements; a touch input sensor comprising touch input sensing elements, wherein: a first set of the touch input sensing elements overlaps a first one of the compressive force sensing elements; and a second set of the touch input sensing elements overlaps a second one of the compressive force sensing elements; and a controller configured to: in a first scan, simultaneously drive the first set of the touch input sensing elements and the first set of the compressive force sensing elements to a first potential; and in a second scan, simultaneously drive the second set of the touch input sensing elements and the second set of the compressive force sensing elements to a second potential.

One or more of the above clauses can include one or more of the features described below. It is noted that any of the following clauses may be combined in any combination with each other, and placed into a respective independent clause, e.g., Clause A, B, or C.

Clause 1: a controller; a tip moveable with respect to the housing; and a force sensor configured to indicate to the controller when a force is applied to the tip.

Clause 2: the compressive force sensor comprises compressive force sensing elements each configured to provide an output indicating a corresponding distance between the compressive force sensor and the support member.

Clause 3: the touch input sensor comprises touch input sensing elements each configured to provide an output indicating when a user is contacting a corresponding portion of the housing.

Clause 4: the compressive force sensor comprises compressive force sensing elements extending longitudinally and distributed circumferentially within the housing.

Clause 5: the touch input sensor comprises touch input sensing elements distributed circumferentially and longitudinally within the housing.

Clause 6: each of the compressive force sensing elements overlaps multiple ones of the touch input sensing elements.

Clause 7: the support member is a cylinder; and the housing comprises inner and outer surfaces each having a curved portion and a flat portion extending along a longitudinal length of the housing.

Clause 8: the elastic insert biases the compressive force sensor away from the support member and the touch input sensor towards the housing.

Clause 9: an elastic insert positioned between the support member and the compressive force sensor.

Clause 10: the elastic insert comprises a dielectric material.

Clause 11: the touch input sensing elements extend over the compressive force sensing elements.

Clause 12: each of the touch input sensing elements and the compressive force sensing elements comprises a conductive material.

Clause 13: a controller configured to: drive the compressive force sensing elements to a potential and measure the first output; and drive the touch input sensing elements to the potential and measure the second output.

Clause 14: the first set of the touch input sensing elements and the first set of the compressive force sensing elements are within a first column; the second set of the touch input sensing elements and the second set of the compressive force sensing elements are within a second column, the second column and the first column extending in parallel and longitudinally along a longitudinal length of the stylus.

Clause 15: in the first scan, the second set of the touch input sensing elements are connected to ground; and in the second scan, the first set of the touch input sensing elements are connected to ground.

Clause 16: a support member radially inside the touch input sensor and the compressive force sensor; and a housing radially outside the touch input sensor and the compressive force sensor.

Clause 17: the controller is further configured to: in the first scan, measure the first set of the touch input sensing elements to provide a first output indicating when a user is contacting a corresponding portion of the housing; and in the first scan, measure the first set of the compressive force sensing elements to provide a second output indicating a distance between the compressive force sensor and the support member.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A stylus comprising:
    a support member;
    an elastic insert positioned about the support member;
    a compressive force sensor positioned about the elastic insert;
    a touch input sensor positioned about the compressive force sensor; and
    a housing positioned about the touch input sensor.

2. The stylus of claim 1, further comprising:
    a controller;
    a tip moveable with respect to the housing; and
    a force sensor configured to indicate to the controller when a force is applied to the tip.

3. The stylus of claim 1, wherein the compressive force sensor comprises compressive force sensing elements each configured to provide an output indicating a corresponding distance between the compressive force sensor and the support member.

4. The stylus of claim 1, wherein the touch input sensor comprises touch input sensing elements each configured to provide an output indicating when a user is contacting a corresponding portion of the housing.

5. The stylus of claim 1, wherein the compressive force sensor comprises compressive force sensing elements extending longitudinally and distributed circumferentially within the housing.

6. The stylus of claim 5, wherein the touch input sensor comprises touch input sensing elements distributed circumferentially and longitudinally within the housing.

7. The stylus of claim 6, wherein each of the compressive force sensing elements overlaps multiple ones of the touch input sensing elements.

8. The stylus of claim 1, wherein:
    the support member is a cylinder; and
    the housing comprises inner and outer surfaces each having a curved portion and a flat portion extending along a longitudinal length of the housing.

9. The stylus of claim 1, wherein the elastic insert biases the compressive force sensor away from the support member and the touch input sensor towards the housing.

10. A stylus comprising:
    a support member;
    a housing positioned;
    a compressive force sensor between the support member and the housing and comprising multiple compressive force sensing elements, wherein each of the compressive force sensing elements is configured to provide a first output indicating a corresponding distance between the compressive force sensor and the support member; and
    a touch input sensor between the support member and the housing and comprising multiple touch input sensing elements, wherein each of the touch input sensing elements is configured to provide a second output indicating when a user is contacting a corresponding portion of the housing.

11. The stylus of claim 10, further comprising an elastic insert positioned between the support member and the compressive force sensor.

12. The stylus of claim 11, wherein the elastic insert comprises a dielectric material.

13. The stylus of claim 10, wherein the touch input sensing elements extend over the compressive force sensing elements.

14. The stylus of claim 10, wherein each of the touch input sensing elements and the compressive force sensing elements comprises a conductive material.

15. The stylus of claim 10, further comprising a controller configured to:
   drive the compressive force sensing elements to a potential and measure the first output; and
   drive the touch input sensing elements to the potential and measure the second output.

16. A stylus comprising:
   a compressive force sensor comprising compressive force sensing elements;
   a touch input sensor comprising touch input sensing elements, wherein:
      a first set of the touch input sensing elements overlaps a first one of the compressive force sensing elements; and
      a second set of the touch input sensing elements overlaps a second one of the compressive force sensing elements; and
   a controller configured to:
      in a first scan, simultaneously drive the first set of the touch input sensing elements and the first set of the compressive force sensing elements to a first potential; and
      in a second scan, simultaneously drive the second set of the touch input sensing elements and the second set of the compressive force sensing elements to a second potential.

17. The stylus of claim 16, wherein:
   the first set of the touch input sensing elements and the first set of the compressive force sensing elements are within a first column;
   the second set of the touch input sensing elements and the second set of the compressive force sensing elements are within a second column, the second column and the first column extending in parallel and longitudinally along a longitudinal length of the stylus.

18. The stylus of claim 16, wherein:
   in the first scan, the second set of the touch input sensing elements are connected to ground; and
   in the second scan, the first set of the touch input sensing elements are connected to ground.

19. The stylus of claim 16, further comprising:
   a support member radially inside the touch input sensor and the compressive force sensor; and
   a housing radially outside the touch input sensor and the compressive force sensor.

20. The stylus of claim 19, wherein the controller is further configured to:
   in the first scan, measure the first set of the touch input sensing elements to provide a first output indicating when a user is contacting a corresponding portion of the housing; and
   in the first scan, measure the first set of the compressive force sensing elements to provide a second output indicating a distance between the compressive force sensor and the support member.

* * * * *